UNITED STATES PATENT OFFICE 2,784,213
Patented Mar. 5, 1957

2,784,213

PRODUCTION OF TEREPHTHALONITRILE

Adalbert Farkas, Jenkintown, Alfred F. D'Alessandro, Havertown, and Rudolph Rosenthal, East Lansdowne, Pa., assignors, by mesne assignments, to Aries Associates, Inc., New York, N. Y., a corporation of New York No Drawing. Application June 17, 1954,
Serial No. 437,588

14 Claims. (Cl. 260—465)

This invention relates to a process for the production of terephthalonitrile by reacting certain terpenes or mixtures thereof with ammonia and oxygen at elevated temperatures in the presence of suitable catalysts.

As disclosed in U. S. P. 2,030,802 of February 11, 1936, turpentine, when oxidized with oxygen in the vapor phase at a temperature of 250°–500° C. and in the presence of an oxide of vanadium or molybdenum or other oxidation catalyst, forms maleic acid.

We have now made the surprising discovery that a variety of terpenes which are in abundant supply at a relatively low cost, including turpentine containing a predominant amount of pinenes, can be directly converted to terephthalonitrile of high purity and in good yields by reaction of the terpenes with oxygen and ammonia in the presence of oxidation catalysts.

The terpenes which can be treated in accordance with our invention have the formula $C_{10}H_{16}$ and consist of a six-membered ring in which a methyl or methylene group is attached to the carbon in the 1-position, and an isopropyl, isopropenyl or isopropylidene group is attached to the carbon in the 4-position. These hydrocarbons contain either two double bonds, or one double bond and a bridging bond between two carbon atoms in the six-membered ring or between one carbon atom in the six-membered ring and the central carbon atom of the isopropylidene group. The most common examples of these terpene hydrocarbons are $\alpha$-pinene, $\beta$-pinene, dl-limonene (dipentene), d-limonene, l-limonene, terpinolene, $\alpha$-, $\beta$- and $\gamma$-terpinene and $\alpha$- and $\beta$-phellandrene. In addition to these terpene hydrocarbons, most of which are common constituents of essential oils and oleoresins exuded by, or contained in the wood of certain trees, chiefly of the pine species, the carenes, bornylene, thujenes, sabinene and $\Delta^{2:8(9)}$-menthadiene can be used for the production of terephthalonitrile according to our invention. The structural formulae of these terpenes are shown below:

α-pinene
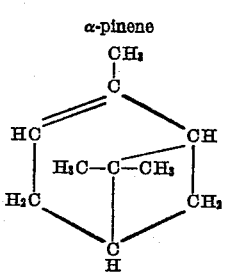

β-pinene
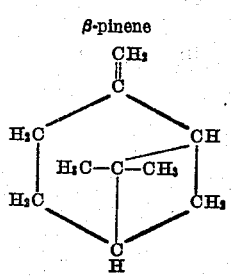

dl-limonene
d-limonene
l-limonene
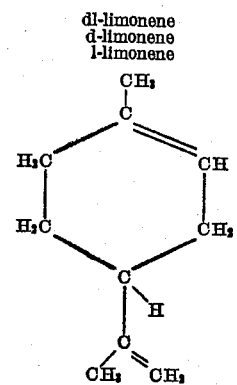

terpinolene
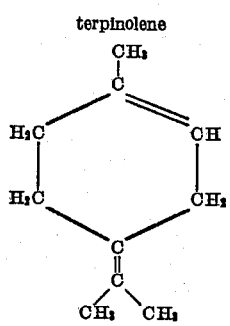

α-terpinene
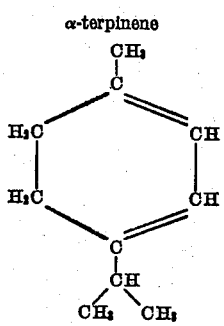

β-terpinene
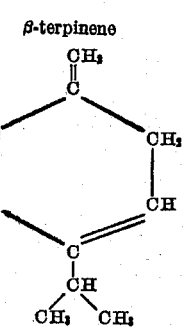

γ-terpinene
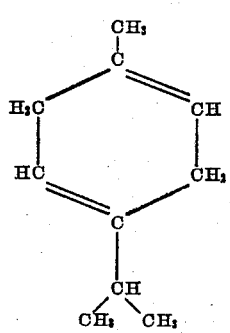

α-phellandrene
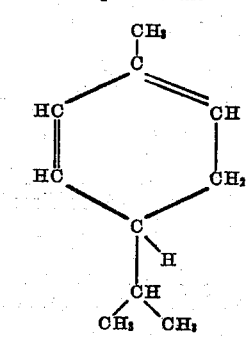

β-phellandrene
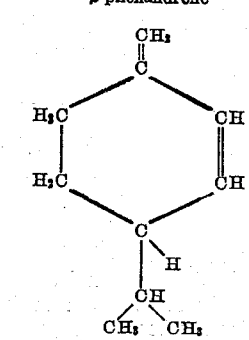

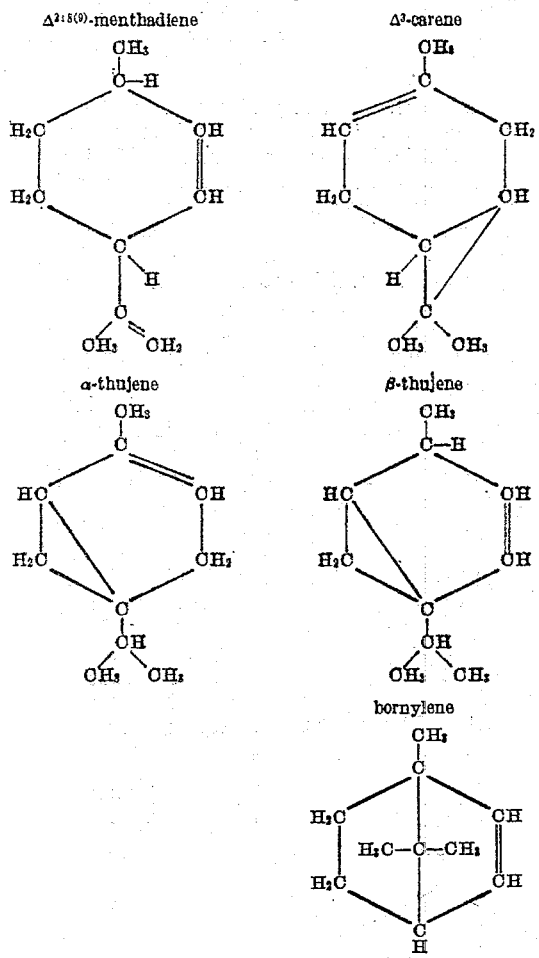
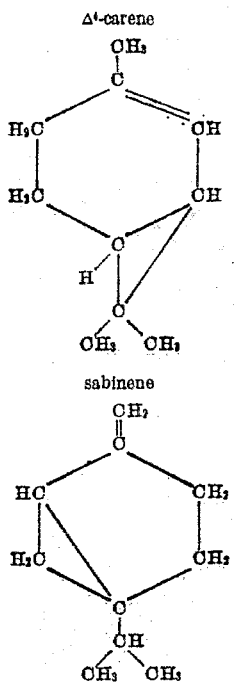

In addition to the pure terpenes, mixtures of these terpenes with each other and with related compounds which are derived from the terpenes by oxidation, hydrogenation or hydration can be utilized according to our invention. Such related compounds per se or mixtures thereof can also be used as starting materials in our process. We have also found that various grades of turpentine, technical or commercial dipentene, and other similar type products which are derived from terpene-containing natural material by distillation or other physical or chemical methods and which contain an appreciable portion of the aforementioned terpenes, can also be employed as reactants in our process.

One group of raw materials particularly suitable for the process of this invention comprises the turpentines which contain a predominant amount of pinenes. These turpentines are readily available on the market at relatively low cost. Because of the complex molecular structure of the turpentines it was entirely unexpected that they would directly produce good yields of terephthalonitrile of high purity. One type of turpentine suitable for use in this invention is "Starpyn" turpentine which contains 64% α-pinene, 25% β-pinene and 11% other terpenes. Other particularly suitable reactants for our process are technical or commercial dipentenes which are mixtures containing varying amounts of dipentene together with other terpenes having the structures specified above. For the sake of brevity, such dipentenes are referred to hereinafter and in the appended claims as crude dipentenes. As in the case with the turpentines, we have unexpectedly found that the crude dipentenes are directly converted to high purity terephthalonitrile in good yields by the process of this invention. Still another particularly suitable raw material for our process is d-limonene which can be recovered from the skins of citrus fruit as well as pine needles.

In place of ammonia a primary alkyl amine may be used to form the terephthalonitrile of this invention. Any nitrogen compound converted into ammonia at the elevated temperatures at which oxidation of the terpene reactant is carried out may also be used in place of ammonia. The reaction mixture should contain at least about two mols of ammonia for each mol of terpene compound. Especially good yields of terephthalonitrile are obtained by using about 4 to 15 mols of ammonia for each mol of terpene compound. When a primary alkyl amine is employed instead of ammonia, the same molecular proportions of amine to terpene reactant are used as described above for ammonia.

The oxidizing agent used in the present process is oxygen. Although air is the preferred oxidizing agent, the feed mixture can also be made up with oxygen, oxygen-enriched air or air or oxygen diluted with nitrogen, carbon dioxide, steam or other inert gases.

While the active components of the feed mixture are the terpenes, ammonia and oxygen, we have found that by recycling a major portion of the gases leaving the reactor after the terephthalonitrile product has been removed, the ammonia consumption can be appreciably reduced since a considerable amount of the ammonia feed leaves the reactor unchanged. In addition, using this technique, unattacked terpene can be returned to the reactor and can be utilized again.

In carrying out the present invention, the terpene, mixture of terpenes or terpene-containing material is mixed with air or other oxygen-containing gas and ammonia in proportion such that the mixture is non-explosive, and the mixture is then passed at temperatures ranging from about 300° to 600° C. in contact with an oxidation catalyst. While the several reaction conditions are related to each other so variations in one condition will permit varying another condition without substantially affecting the results of the process, a representative set of conditions is as follows: passing a reaction mixture containing about 4 to 15 mols ammonia and about 5 to 50 mols of oxygen for every mol of terpene reactant over a vanadium oxide-containing catalyst at a temperature of about 375° to 475° C. and a space velocity of 1000 to 5000 cc. of reaction gas (calculated at S. T. P.) per hour per cubic centimeter apparent volume of catalyst.

The catalysts employed in carrying out the process of this invention may be metal oxides which promote the partial oxidation of organic compounds. Preferably the catalysts used are those which promote dehydrogenation of hydrocarbons and their oxidation to oxygen-containing partial oxidation products. Typical among such catalysts are the oxides of vanadium, molybdenum, columbium, uranium and manganese. These metal oxides can be used alone or mixed with each other. They may advantageously be supported on active alumina, for example γ-alumina. In fact, with many of the catalysts, it is preferred that alumina be present. Particularly efficient catalysts are those containing an oxide of vanadium. The preparation and composition of a few suitable catalysts are described, for example, in U. S. Patents 2,081,272 issued May 25, 1937, 2,180,353 issued November 21, 1939 and 2,294,130 issued August 25, 1942.

Although the catalyst may be employed in the form of a fixed bed, it is preferred to effect the reaction employing the catalyst in a fluidized form. We have found that by use of a fluidized catalyst better control of the reaction is facilitated and maximum conversion and efficiency of the process is realized. The catalyst may be maintained in fluidized form by passing the gaseous reaction mixture through the catalyst bed at gas velocities of 0.02 to one foot per second, while maintaining suitable bed depth of say ½ to 10 feet to maintain the desired space velocity.

While the suitable temperatures will vary somewhat according to the particular catalyst being employed and other operating conditions, in general, the reaction mixture containing the terpene reactant, oxygen and ammonia or primary alkyl amine is contacted with the catalyst at temperatures varying from about 300° to 600° C., preferably at about 375° to 475° C.

The contact time defined as the ratio of the catalyst volume to the flow rate of gas (at reaction conditions) is generally within the range of about 0.1 to 10 seconds. Contact time may be varied for any given depth of catalyst bed by adjusting the space velocity of the gaseous reactants.

The initial terephthalonitrile product formed by the process of this invention usually has a purity of at least about 92%. If desired or required, the initial product may be further purified by simple conventional sublimation or distillation procedures to produce terephthalonitrile which is, for all intents and purposes, entirely pure.

Terephthalonitrile may be readily hydrolyzed by known methods in substantially quantitative yield to terephthalic acid. Terephthalic acid is useful for making fibers of the polyester type and as raw material for other polymeric products. In addition, terephthalonitrile may be readily converted to terephthalic acid esters valuable as plasticizers for vinyl and other types of resins. Terephthalonitrile may also be used directly in the production of various intermediates, resins and other useful products.

Our invention will be further illustrated by the following examples, in which about atmospheric pressure was used:

*Example 1.*—A gaseous mixture of ammonia, α-pinene vapors, air and nitrogen in the proportions of 4.56 mols of ammonia, 0.76 mol of α-pinene, 71.6 mols of air, and 23.08 mols of nitrogen was passed through a fluidized bed of vanadium pentoxide catalyst at 424° C. and at a space velocity of 1835, which corresponded to a contact time of 0.77 second. The vanadium pentoxide catalyst was prepared by grinding fused vanadium pentoxide containing some alumina and screening to 105 to 210 micron size. The reaction products were cooled, and a solid material separated out. The solid material was filtered, washed with water and "Skelly-solve" (a commercial solvent consisting of hexanes, heptanes, octanes and solvent naphtha). Upon drying, the solid product was shown to be 93.2% pure terephthalonitrile, its yield being 31.3 mol percent based on the α-pinene fed. After sublimation, the product had a melting point of 226° to 227.6° C., and its ultraviolet absorption spectrum coincided with that of pure terephthalonitrile.

*Example 2.*—A gaseous mixture of ammonia, vapors of "Starpyn" turpentine, air and nitrogen in the proportions of 4.67 mols of ammonia, 0.4 mol of "Starpyn" turpentine (assuming a molecular weight of 136), 82.2 mols of air, and 12.73 mols of nitrogen was passed through a fluidized bed of the catalyst of Example 1 at 412° C. and at a space velocity of 1795, which corresponded to a contact time of 0.80 second. The dried solid product recovered as in Example 1 was 92.5% pure terephathalonitrile, its yield being 36.7 mol percent based on the turpentine fed. After sublimation, the product has a melting point of 224.5° to 226° C., and its ultraviolet absorption spectrum was identical to that of pure terephthalonitrole.

*Example 3.*—A gaseous mixture of ammonia, technical dipentene (a crude mixture of about 50% dipentene and about 50% other terpenes), air and nitrogen, in the proportions of 3.9 mols of ammonia, 0.4 mol of technical dipentene, 68.8 mols of air and 26.9 mols of nitrogen was passed through a fluidized bed of the catalyst of Example 1 at 412° C. and at a space velocity of 1795, which corresponded to a contact time of 0.80 second. The dried solid product obtained as in Example 1 was 93.7% pure terephthalonitrile, its yield being 48.1 mol percent based on the dipentene fed. After sublimation, the product melted at 225° to 226.5° C.

*Example 4.*—A gaseous mixture of the vapors of a commercial dipentene (a crude mixture of 18.8% dipentene, 26.2% terpinolene, 16.8% pinenes, 18.4% terpinenes and 18.4% other terpenes), ammonia, air and nitrogen in the proportions of 0.7 mol of commercial dipentene (assuming a molecular weight of 136), 8.6 mols of ammonia, 52.4 mols of air and 38.3 mols of nitrogen was passed through a fluidized bed of the catalyst of Example 1 at 422° C. and at a space velocity of 2000, which corresponded to a contact time of 0.71 second. The dried solid product obtained as in Example 1 was about 95% pure terephthalonitrile, and its yield was 47.3 mol percent based on the commercial dipentene fed.

*Example 5.*—A gaseous mixture of vapors of terpinolene, ammonia, air and notrogen in the proportions of 0.93 mol of terpinolene, 9.7 mols of ammonia, 58.4 mols of air and 31.0 mols of nitrogen was passed through a fluidized bed of the catalyst of Example 1 at 410°–420° C. and at a space velocity of 1765, which corresponded to a contact time of 0.81 second. The dried solid product recovered as in Example 1 was about 95% pure terephthalonitrile, its yield being 24.1 mol percent based on the terpinolene fed.

*Example 6.*—A gaseous mixture of substantially pure dipentene, ammonia, air and nitrogen in the proportions of 0.78 mol of dipentene, 8.14 mols of ammonia, 48.8 mols of air and 42.3 mols of nitrogen was passed through a fluidized bed of the catalyst of Example 1 at 420° C. and at a space velocity of 2110, which corresponded to a contact time of 0.67 second. The dried solid product recovered as in Example 1 was about 95% pure terephthalonitrile, its yield being 44.5 mol percent based on the dipentene fed.

*Example 7.*—A gaseous mixture containing 0.38 mol percent of the commercial dipentene used in Example 4 (assuming a molecular weight of 136), 3.9 mol percent ammonia, 69.2 mol percent air and 26.52 mol percent nitrogen was passed through a fluidized bed of columbium oxide at 495° C. at a space velocity of 2145, which corresponded to a contact time of 0.60 second. The dried solid product obtained as in Example 1 was terephthalonitrile of 96.5% purity, the yield being 24.4 mol percent based on the dipentene fed.

*Example 8.*—A gaseous mixture containing 0.37 mol percent of the commercial dipentene used in Example 4 (assuming a molecular weight of 136), 3.9 mol percent ammonia, 69.4 mol percent air and 26.33 mol percent nitrogen was passed through a fluidized bed of a molybdena-alumina catalyst at 400° C. and at a space velocity of 2145, which corresponded to a contact time of 0.68 second. Terephthalonitrile of 95% purity was obtained at a molar yield of 12.8% based on the dipentene fed.

*Example 9.*—A gaseous mixture of vapors of d-limonene, ammonia, air and nitrogen in the proportions of 0.78 mol of d-limonene, 8.14 mols of ammonia, 48.8 mols of air and 42.28 mols of nitrogen was passed through a fluidized bed of the catalyst of Example 1 at 421° C. and at a space velocity of 2110, which corresponded to a contact time of 0.67 second. The dried solid product obtained as in Example 1 was terephthalonitrile of about 95% purity, and its yield was 49.0 mol percent based on the d-limonene fed.

Oxidation catalysts such as uranium oxide, manganese oxide and others may be substituted for those used in the above examples to directly obtain good yields of terephthalonitrile of high purity.

While we have described preferred embodiments for carrying out the process of our invention, it will be apparent that many changes may be made without departing from the spirit of our invention.

We claim:

1. The method of preparing terephthalonitrile which comprises passing a gaseous mixture comprising ammonia, oxygen and a member of the group consisting of terpenes having the formula $C_{10}H_{16}$ and consisting of a six-membered ring having attached to the carbon in the 1-position a member of the group consisting of methyl and methylene radicals and to the carbon in the 4-position a member of the group consisting of isopropyl, isopropenyl and isopropylidene radicals, and mixtures of such terpenes, into contact with an oxidation catalyst at a temperature of about 300° to 600° C.

2. The method of preparing terephthalonitrile which comprises passing a gaseous mixture comprising one mol of a member of the group consisting of terpenes having the formula $C_{10}H_{16}$ and consisting of a six-membered ring having attached to the carbon in the 1-position a member of the group consisting of methyl and methylene radicals and to the carbon in the 4-position a member of the group consisting of isopropyl, isopropenyl and isopropylidene radicals, and mixtures of such terpenes, at least about two mols of ammonia and at least about 5 mols of oxygen into contact with an oxidation catalyst at a temperature of about 300° to 600° C.

3. The process for the production of terephthalonitrile which comprises passing ammonia, oxygen, and a terpene having the formula $C_{10}H_{16}$ and consisting of a six-membered ring having attached to the carbon in the 1-position a member of the group consisting of methyl and methylene radicals and to the carbon in the 4-position a member of the group consisting of isopropyl, isopropenyl and isopropylidene radicals, in vapor phase, over a metal oxide organic oxidation catalyst at a temperature of about 300° to 550° C.

4. The method of preparing terephthalonitrile which comprises passing a gaseous mixture comprising one mol of a member of the group consisting of terpenes having the formula $C_{10}H_{16}$ and consisting of a six-membered ring having attached to the carbon in the 1-position a member of the group consisting of methyl and methylene radicals and to the carbon in the 4-position a member of the group consisting of isopropyl, isopropenyl and isopropylidene radicals, and mixtures of such terpenes, at least about two mols of ammonia and at least about 5 mols of oxygen into contact with a vanadium oxide-containing catalyst at a temperature of about 375° to 475° C.

5. The method of preparing terephthalonitrile which comprises passing a gaseous mixture comprising one mol of a member of the group consisting of terpenes having the formula $C_{10}H_{16}$ and consisting of a six-membered ring having attached to the carbon in the 1-position a member of the group consisting of methyl and methylene radicals and to the carbon in the 4-position a member of the group consisting of isopropyl, isopropenyl and isopropylidene radicals, and mixtures of such terpenes, about 4 to 15 mols of ammonia and about 5 to 50 mols of oxygen into contact with a fluidized vanadium oxide-containing catalyst at a temperature of about 375° to 475° C.

6. The method of preparing terephthalonitrile which comprises passing a gaseous mixture comprising one mol of pinene, at least about two mols of ammonia and at least about 5 mols of oxygen into contact with an oxidation catalyst at a temperature of about 300° to 600° C.

7. The method of preparing terephthalonitrile which comprises passing a gaseous mixture comprising one mol of a limonene, at least about two mols of ammonia and at least about 5 mols of oxygen into contact with an oxidation catalyst at a temperature of about 300° to 600° C.

8. The method of preparing terephthalonitrile which comprises passing a gaseous mixture comprising one mol of a turpentine containing a predominant amount of pinenes, at least about two mols of ammonia and at least about 5 mols of oxygen into contact with an oxidation catalyst at a temperature of about 300° to 600° C.

9. The method of preparing terephthalonitrile which comprises passing a gaseous mixture comprising one mol of a crude dipentene, at least about two mols of ammonia and at least about 5 mols of oxygen into contact with an oxidation catalyst at a temperature of about 300° to 600° C.

10. The method of preparing terephthalonitrile which comprises passing a gaseous mixture comprising one mol of α-pinene, about 4 to 15 mols of ammonia and about 5 to 50 mols of oxygen into contact with a fluidized vanadium oxide-containing catalyst at a temperature of about 375° to 475° C.

11. The method of preparing terephthalonitrile which comprises passing a gaseous mixture comprising one mol of β-pinene, about 4 to 15 mols of ammonia and about 5 to 50 mols of oxygen into contact with a fluidized vanadium oxide-containing catalyst at a temperature of about 375° to 475° C.

12. The method of preparing terephthalonitrile which comprises passing a gaseous mixture comprising one mol of a limonene, about 4 to 15 mols of ammonia and about 5 to 50 mols of oxygen into contact with a fluidized vanadium oxide-containing catalyst at a temperature of about 375° to 475° C.

13. The method of preparing terephthalonitrile which comprises passing a gaseous mixture comprising one mol of turpentine containing a predominant amount of pinenes, about 4 to 15 mols of ammonia and about 5 to 50 mols of oxygen into contact with a fluidized vanadium oxide-containing catalyst at a temperature of about 375° to 475° C.

14. The method of preparing terephthalonitrile which comprises passing a gaseous mixture comprising one mol of a crude dipentene, about 4 to 15 mols of ammonia and about 5 to 50 mols of oxygen into contact with a fluidized vanadium oxide-containing catalyst at a temperature of about 375° to 475° C.

References Cited in the file of this patent

UNITED STATES PATENTS

| | | |
|---|---|---|
| 2,486,934 | Erchak | Nov. 1, 1949 |
| 2,499,055 | Cosby et al. | Feb. 28, 1950 |